United States Patent [19]

Fukumoto et al.

[11] Patent Number: 5,056,182
[45] Date of Patent: Oct. 15, 1991

[54] WIPER STRUCTURE WITH VARIABLE WIPING PRESSURE

[75] Inventors: Ryoichi Fukumoto, Nagoya; Tokihiko Yamamoto, Kariya; Gosaku Terabayashi, Okazaki; Eiichi Hamada, Toyota, all of Japan

[73] Assignees: Aisin Seiki Kabushiki Kaisha; Toyota Jidosha Kabushiki Kaisha, both of Aichi, Japan

[21] Appl. No.: 578,648

[22] Filed: Sep. 7, 1990

[30] Foreign Application Priority Data

Sep. 8, 1989 [JP] Japan .................. 1-233131

[51] Int. Cl.$^5$ .............. B60S 1/18; B60S 1/04
[52] U.S. Cl. .................. 15/250.20; 15/250.34
[58] Field of Search .......... 15/250.20, 250.19, 250.21, 15/250 R, 250.34

[56] References Cited

U.S. PATENT DOCUMENTS

| 3,026,555 | 3/1962 | Dudley | 15/250.20 |
| 4,698,872 | 10/1987 | Watanabe | 15/250.20 |

FOREIGN PATENT DOCUMENTS

| 3329573 | 3/1985 | Fed. Rep. of Germany | 15/250.20 |
| 605228 | 5/1960 | Italy | 15/250.20 |
| 0086840 | 7/1981 | Japan | 15/250.20 |
| 0138450 | 8/1982 | Japan | 15/250.20 |
| 0064563 | 4/1986 | Japan | 15/250.20 |
| 61-71254 | 4/1986 | Japan | |
| 62-59151 | 3/1987 | Japan | |
| 0097451 | 4/1988 | Japan | 15/250.20 |
| 63-235147 | 9/1988 | Japan | |

Primary Examiner—Harvey C. Hornsby
Assistant Examiner—Gary K. Graham
Attorney, Agent, or Firm—Finnegan, Henderson, Farabow, Garrett & Dunner

[57] ABSTRACT

A vehicle windshield wiper structure has a wiper arm connected to a wiper head and supports a wiper blade which is adapted to be forced onto the surface of the windshield glass. A spring is provided to force the wiper blade into engagement with the windshield glass surface. The spring is engaged at one end with an intermediate portion of the wiper arm and at the other end with an end of a swingable lever which is pivotably mounted on the wiper head. The other end of the swingable lever is provided with a cam follower roller which is adapted to be engaged under a resilient force applied by the spring with a cam provided on a stationary part of the vehicle. The cam has a profile which is slanted at the opposite end portions so that the resilient force depressing the wiper blade into engagement with the windshield glass surface is decreased at each end of the stroke of movement of the wiper to thereby decrease the noise which may otherwise be produced when the wiper movement is inverted.

5 Claims, 4 Drawing Sheets

WIPER STRUCTURE WITH VARIABLE WIPING PRESSURE

BACKGROUND OF THE INVENTION

1. Field of the Invention

The present invention relates to a wiper structure for vehicles and more particularly to a variable depressing pressure wiper structure wherein the depressing pressure can varied when the wiper blade is inverted its direction of movement.

2. Description of the Prior Art

In vehicle wiper structures such as those for a front windshield glass or a rear window glass, the wiper blade is reciprocated by means of a driving structure so that the direction of movement is periodically inverted. It has been experienced that the wiper blade hits the glass surface to produce noise when the direction of movement is inverted. It is therefore desired to decrease such noise produced when the wiper blade is inverted its direction of movement.

It has been recognized that the level of noise is mainly dependent on the pressure under which the wiper blade is depressed on the glass surface. It is therefore necessary to decrease the depressing pressure for decreasing the noise. The Japanese laid-open patent application Sho 62-59151 discloses a structure wherein the depressing pressure can be changed as desired. According to the proposal by the Japanese application, the wiper blade is supported on a wiper arm which is in turn supported on a rotatable shaft by means of a pivot pin for a movement toward and away from the glass surface. A spring is provided to force the wiper arm toward the glass surface so that the wiper blade is depressed on the glass surface. The spring is connected at one end to the wiper arm and at the other end with an adjustable member which is supported on a bracket or other type of stationary member in such a manner that the line of action of the spring is offset toward the glass surface from the line passing through the aforementioned one end of the spring and the aforementioned pivot pin supporting the wiper arm whereby the spring force produces a component directed toward the glass surface. A motor is provided to move the adjustable member at the end of the stroke of the reciprocating movement of the wiper blade so that the distance of the offset is decreased to thereby decrease the depressing pressure.

It should however be noted that the structure proposed by the Japanese patent application is not suitable for use in controlling the depressing pressure for the purpose of decreasing the noise produced when the movement of the wiper blade is inverted because it becomes necessary to detect the end of the stroke of the wiper movement.

SUMMARY OF THE INVENTION

It is therefore an object of the present invention to provide a wiper structure which is simple in arrangement but can decrease the noise effectively.

Another object of the present invention is to provide a wiper structure wherein the depressing pressure can be automatically decreased at each end of the stroke of the wiper movement.

A further object of the present invention is to provide a wiper structure wherein the depressing pressure of the wiper blade against the glass surface can be automatically decreased at each end of the wiper stroke without detecting the end of the stroke.

According to the present invention, the above and other objects can be accomplished by a wiper structure comprising stationary means supporting wiper head means for reciprocating rotational movement in a plane, wiper arm means supported on said wiper head means for pivotable movement in a direction perpendicular to said plane in which said wiper head means is rotationally moved, wiper blade means carried by said wiper arm means, resilient biasing means for urging said wiper arm means and said wiper blade means toward a surface which is adapted to be wiped by said wiper blade means, cam means for changing biasing force which is applied by said resilient biasing means to said wiper arm means and said wiper blade means so that the biasing force is decreased at each end of stroke of said reciprocating rotational movement.

According to a preferable aspect of the present invention, the resilient biasing means includes a spring having one end connected with the wiper arm means. A pivotable lever means is provided on said wiper head means for a pivotable movement in a direction perpendicular to said plane in which said wiper head means is moved. The lever means has one end connected with the other end of the spring and the other end engaged with said cam means which is provided on said stationary means.

According to the features of the present invention, the biasing force applied by the resilient biasing means to the wiper arm means and said wiper blade means is automatically decreased at each end of the stroke of the reciprocating rotational movement of the wiper head means. Therefore, the depressing force of the wiper blade means onto the front windshield glass surface or the rear window glass surface can be automatically decreased at each end of the stroke to thereby decreased noise produced by the wiper blade means when it inverts its direction of movement.

The above and other objects and features of the present invention will become apparent from the following description of a preferred embodiment taking reference to the accompanying drawings.

DESCRIPTION OF THE PREFERRED EMBODIMENT

Figure 1:
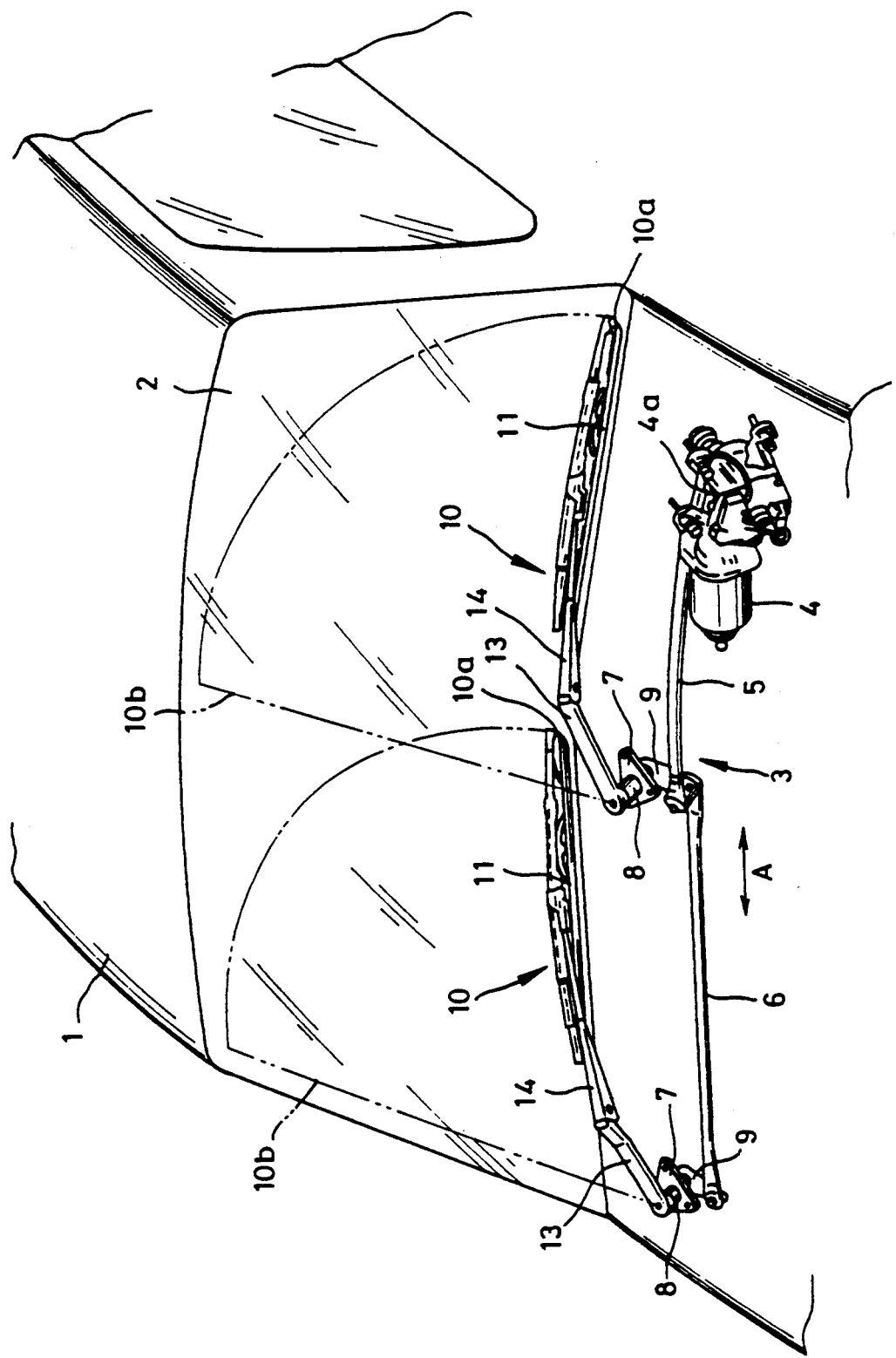
FIG. 1 is a perspective view of a vehicle front windshield glass wiper structure in accordance with one embodiment of the present invention.

Referring to the drawings, particularly to FIG. 1, there is shown a vehicle including a body 1 which has a front windshield glass 2. The vehicle has a pair of front wiper structures 10. The front wiper structures 10 have a common driving motor 4 provided with a reciprocating mechanism 4a which may be of a conventional type. The output shaft of the motor 4 is connected through the reciprocating mechanism 4a with a push-pull rod 5 which one end with the reciprocating mechanism 4a. The other end of the push-pull rod 5 is connected with one end of a second push-pull rod 6.

Figure 2:
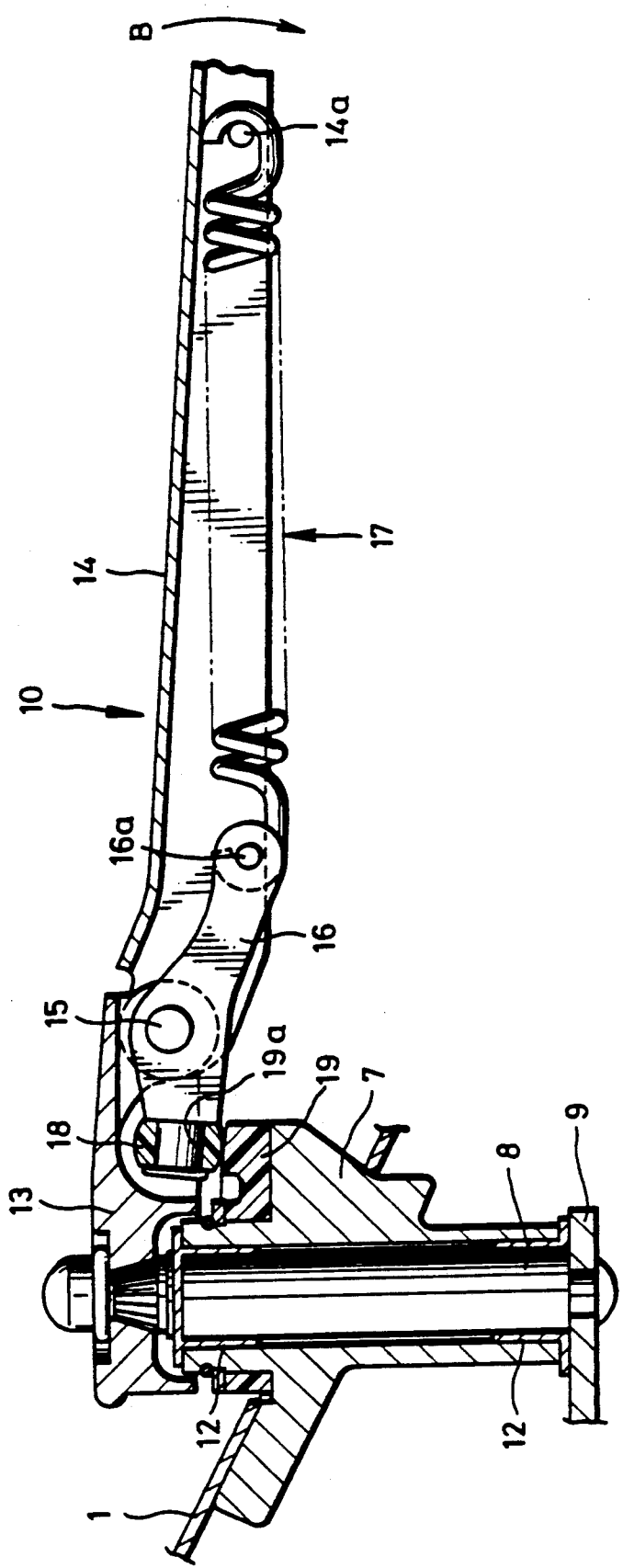
FIG. 2 is a sectional view showing the details of the wiper head and the wiper arm.

Referring now to FIG. 2, it will be noted that the vehicle body 1 is provided with a stationary member 7 such as a bracket which supports a rotatable shaft 8 through a bearing sleeve 12. A swingable lever 9 is provided and connected at one end with a lower end of the rotatable shaft 8. The other end of the lever is pivotably connected by means of a pin to the ends of the push-pull rods 5 and 6 as shown in FIG. 1. In FIG. 2, it will be noted that a wiper head 13 is securely attached to the rotatable shaft 8 so that the wiper head 13 rotates together with the shaft 8. The wiper head 13 carries a wiper arm 14 which is attached at one end to the wiper arm 13 by means of a pivot pin 15 for a pivotable movement about the axis of the pivot pin 15. As shown in FIG. 1, a wiper blade 11 is provided on the wiper arm 14.

Referring again to FIG. 2, there is provided a tension spring 17 which is attached at one end by means of a pin 14a to an intermediate portion of the wiper arm 14. On the pivot pin 15, there is carried a lever 16 which is swingable about the axis of the pin 15. The other end of the spring 17 is attached by means of a pin 16a to one end of the swingable lever 16. On the bracket 7, there is provided a cam member 19 having a cam surface 19a. A cam follower roller 18 is provided on the other end of the swingable lever 16. In FIG. 2, it will be noted that the line of action of the spring 17 which is a line connecting the pins 14a and 16a is offset to lower side from a line passing through the pin 14a and the pivot pin 15. It will therefore be understood that the resilient force exerted by the spring 17 functions to force the cam follower roller 18 on the lever 16 into engagement with the cam surface 19a of the cam 19. The spring 17 further forces the wiper arm 14 in the direction shown by an arrow B in FIG. 2. It will be noted in FIG. 1 that the rotatable shaft 8 is substantially perpendicular to the surface of the windshield glass 2 so that the wiper head 13 is swingably movable substantially along a plane parallel with the surface of the windshield glass 2. The pivot pin 15 on the wiper head 13 is perpendicular to the rotatable shaft 8 so that the wiper head 13 is swingable substantially perpendicularly to the surface of the windshield glass 2. The wiper blade 11 which is carried by the wiper head 13 is therefore forced toward the surface of the windshield glass 2. The depressing pressure under which the wiper blade 11 is forced onto the surface of the windshield glass 2 is determined by the spring force exerted by the spring 17. The spring force is a function of the offset between the line passing through the pins 14a and 16a and the line passing through the pins 14a and 15.

Figure 3:
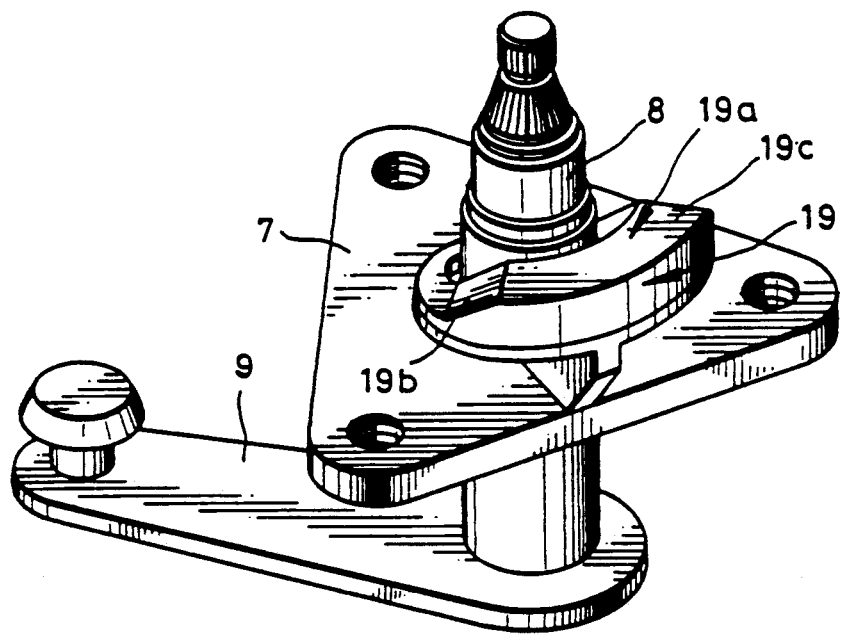
FIG. 3 is a perspective view showing the wiper head and the depressing pressure changing cam.
Figure 4:
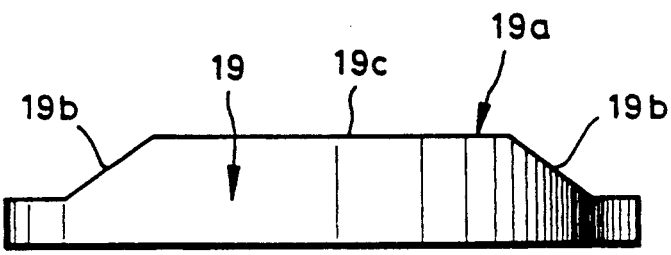
FIG. 4 is an end view showing the profile of the cam.

Referring to FIGS. 3 and 4, it will be noted that the cam surface 19a of the cam 19 has a pair of slanted surfaces 19b which is provided at the opposite end portions of the cam 19 and a substantially flat intermediate portion 19c which is higher than the slanted portions 19b. It will therefore be understood that the spring force pressing the wiper blade toward the surface of the windshield glass 2 is decreased when the cam follower roller 18 is engaged with the slanted portions 19b of the cam surface 19a.

In operation, the motor 4 is energized to drive the push-pull rods 5 and 6 through the reciprocating mechanism 4a back and force as shown by an arrow A in FIG. 1. The levers 9 are then swingably driven by the push-pull rods 5 and 6 to thereby rotate the shafts 8. Thus, the wiper heads 13 are swingably moved to cause swingable movements of the wiper arms 14 and the wiper blades 11. The wiper blades 11 in the respective wiper structures 10 are therefore moved along the surface of the windshield glass 2 in stroke ranges defined by lower ends 10a and an upper ends 10b.

Figure 5:
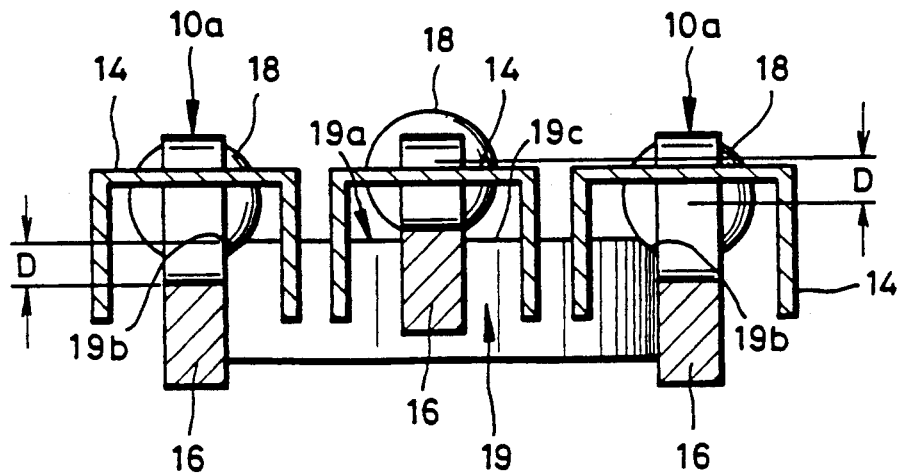
FIG. 5 is a cross-sectional view showing the operation of the structure of the embodiment.
Figure 6:
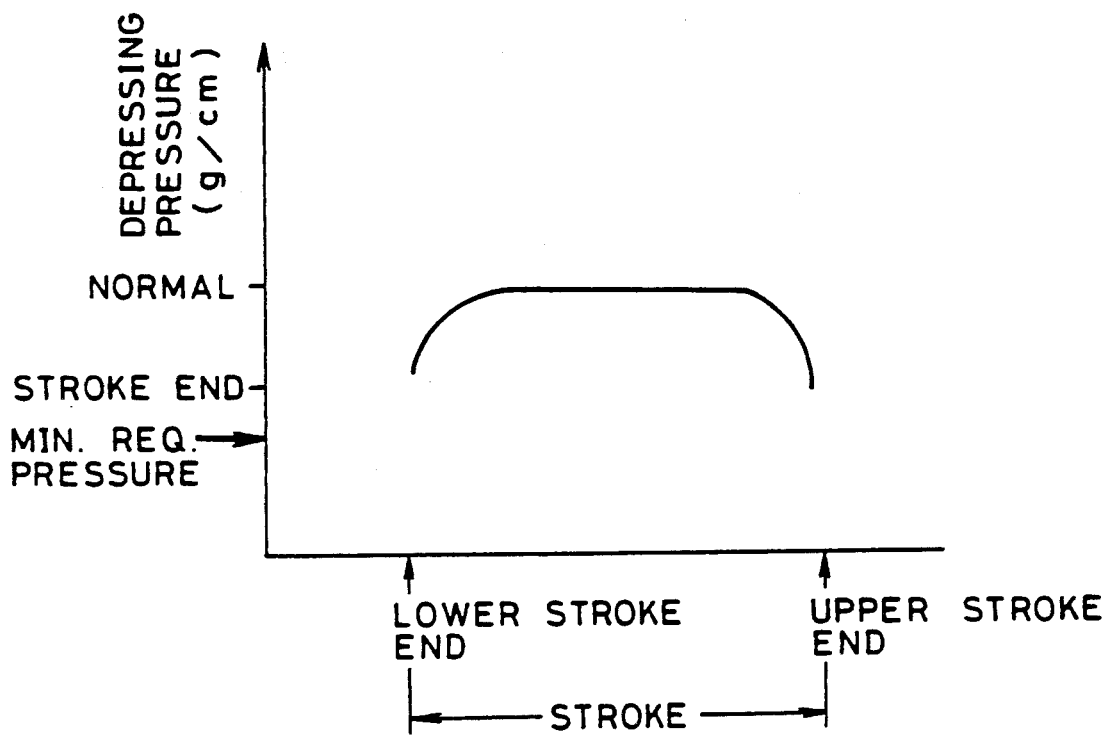
FIG. 6 is a diagram showing an example of the change in the depressing pressure; and, FIG. 7 is a diagram showing the relationship between the depressing pressure and the noise level.
Figure 7:
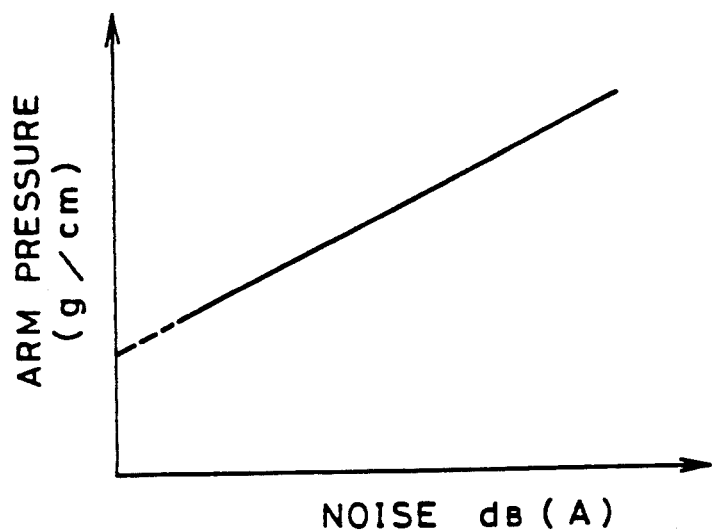

As already described, the wiper blade 11 is forced onto the surface of the windshield glass 2 by means of the spring 17 and the depressing pressure is determined by the value of the offset between the line passing through the pins 14a and 16a and the line passing through the pins 14a and 15. The offset value is determined by the position of the cam follower roller 18 on the cam surface 19a. Referring to FIG. 5, it will be noted that when the cam follower roller 18 is on the intermediate portion 19c of the cam surface, the roller 18 is in a higher position so that a higher spring force is applied to the wiper blade 11. When the cam follower roller 18 is on the slanted portions 19b of the cam surface 19a, the position of the roller 18 is lower by a distance D than the position when the roller 18 is on the intermediate portion 19c of the cam surface 19a. Thus, the spring force exerted to the wiper blade 11 is decreased by a value corresponding to the distance D. It will therefore be understood that the depressing pressure forcing the wiper blade toward the windshield glass surface is automatically decreased at each end of the stroke of the wiper movement as shown in FIG. 6. Therefore, it is possible to decrease the noise which may otherwise be produced when the wiper movement is inverted since the noise level is decreased in response to a decrease in the depressing pressure as shown in FIG. 7.

The invention has thus been shown and described with reference to a specific embodiment, however, it should be noted that the invention is in no way limited to the details of the illustrated structures but changes and modifications may be made without departing from the scope of the appended claims.

We claim:

1. A wiper structure comprising stationary means supporting wiper head means for reciprocating rotational movement in a plane, wiper arm means supported on said wiper head means for pivotable movement through reciprocable strokes in a direction perpendicular to said plane in which said wiper head means is rotationally moved, wiper blade means carried by said wiper arm means, resilient biasing means for urging said wiper arm means and said wiper blade means under a biasing force toward a surface which is adapted to be wiped by said wiper blade means, cam means for changing said biasing force, said cam means having a cam surface, the profile of said cam surface establishing an intermediate surface portion to fix said biasing force through a major portion of each of said strokes, and a pair of opposite end portions for decreasing said biasing force at both ends of each of said strokes.

2. A wiper structure in accordance with claim 1 in which said resilient biasing means includes a spring having one end connected with the wiper arm means, pivotable lever means provided on said wiper head means for a pivotable movement in a direction perpendicular to said plane in which said wiper head means is moved, said lever means having one end connected with the other end of the spring and another end engaged with said cam means.

3. A wiper structure in accordance with claim 2 in which said pair of opposite end portions of said cam surface are lowered relative to said intermediate portion.

4. A wiper structure in accordance with claim 3 in which said lever means is provided at said other end with cam follower means which is engaged with said cam surface on said cam means.

5. A wiper structure in accordance with claim 4 in which said cam follower means is roller means carried by said lever means.

* * * * *